(12) United States Patent
Oh et al.

(10) Patent No.: US 9,083,907 B2
(45) Date of Patent: Jul. 14, 2015

(54) DRIVING CIRCUIT OF IMAGE SENSOR AND METHOD OF OPERATING THE SAME

(71) Applicant: DONGBU HITEK CO., LTD., Seoul (KR)

(72) Inventors: Hack Soo Oh, Namyangju-si (KR); Jeong Kwon Nam, Seoul (KR)

(73) Assignee: Dongbu Hitek Co., LTD., Seoul (KR)

( * ) Notice: Subject to any disclaimer, the term of this patent is extended or adjusted under 35 U.S.C. 154(b) by 194 days.

(21) Appl. No.: 13/832,022

(22) Filed: Mar. 15, 2013

(65) Prior Publication Data

US 2014/0252203 A1    Sep. 11, 2014

(30) Foreign Application Priority Data

Mar. 7, 2013 (KR) .................. 10-2013-0024263

(51) Int. Cl.
*H04N 5/357* (2011.01)
*H04N 5/335* (2011.01)
*H04N 5/378* (2011.01)

(52) U.S. Cl.
CPC ............... *H04N 5/378* (2013.01); *H04N 5/357* (2013.01)

(58) Field of Classification Search
CPC . H04N 5/3742; H04N 5/378; H04N 5/37457; H04N 5/3577; H04N 5/3765; H04N 5/37455; H04N 5/3658; H04N 5/369; H04N 5/335; H04N 3/1593; H04N 3/1575; H04N 3/155; H04N 5/357; H01L 27/14643; H01L 27/14636; H01L 27/14618
USPC .............. 348/221.1, 294, 301, 302, 308, 312, 348/321, 323; 250/208.1; 257/292; 341/155
See application file for complete search history.

(56) References Cited

U.S. PATENT DOCUMENTS

| | | | |
|---|---|---|---|
| 6,545,624 B2* | 4/2003 | Lee et al. .................. 341/155 |
| 7,408,443 B2* | 8/2008 | Nam ........................ 340/308 |
| 7,659,925 B2* | 2/2010 | Krymski .................. 348/222.1 |
| 8,054,354 B2* | 11/2011 | Taura ...................... 348/294 |
| 8,558,933 B2 | 10/2013 | Sakai |
| 8,698,931 B2* | 4/2014 | Kobayashi et al. ........... 348/308 |
| 8,817,153 B2* | 8/2014 | Bahukhandi et al. ......... 348/308 |

(Continued)

FOREIGN PATENT DOCUMENTS

| | | |
|---|---|---|
| JP | 2008294913 A | 12/2008 |
| JP | 2012124729 A | 6/2012 |

(Continued)

OTHER PUBLICATIONS

Korean Notice of Allowance dated Sep. 11, 2014; 1 page.

(Continued)

*Primary Examiner* — Aung S Moe
(74) *Attorney, Agent, or Firm* — Andrew D. Fortney; Central California IP Group, P.C.

(57) ABSTRACT

A driving circuit of an image sensor is provided. The driving circuit can include a pixel array where pixel circuits receiving light and converting the received light into an electrical signal are arranged in columns, an analog-to-digital (ADC) block including a plurality of ADC circuits receiving an analog image signal from pixel circuits arranged in the same column and converting the received analog image signal into a digital signal, and an ADC controller outputting a global signal to control each operation of the ADC circuit. The ADC controller can allow the ADC circuits in the ADC block to operate separately according to at least two timings.

21 Claims, 3 Drawing Sheets

(56) References Cited

U.S. PATENT DOCUMENTS

| | | | |
|---|---|---|---|
| 2003/0043089 A1* | 3/2003 | Hanson et al. | 345/55 |
| 2006/0267054 A1* | 11/2006 | Martin et al. | 257/291 |
| 2009/0051801 A1* | 2/2009 | Mishina et al. | 348/311 |
| 2009/0174802 A1* | 7/2009 | Vogel et al. | 348/308 |
| 2010/0214462 A1* | 8/2010 | Itakura | 348/302 |
| 2012/0013778 A1* | 1/2012 | Sonoda et al. | 348/294 |
| 2012/0147233 A1* | 6/2012 | Sakai | 348/294 |
| 2012/0305752 A1* | 12/2012 | Shimizu et al. | 250/208.1 |
| 2013/0128086 A1* | 5/2013 | Juen | 348/302 |
| 2014/0183333 A1* | 7/2014 | Johansson | 250/208.1 |

FOREIGN PATENT DOCUMENTS

| | | |
|---|---|---|
| JP | 2012-222632 A | 11/2012 |
| KR | 10-2008-0013495 A | 2/2008 |
| KR | 100803229 B1 | 2/2008 |
| WO | 2008018721 A1 | 2/2008 |

OTHER PUBLICATIONS

Keijiro Itakura; "Solid-State Imaging Apparatus and It's Driving Method"; Dec. 4, 2008; Abstract of JP2008294913 (A); 2 pages.

"Image Pickup Device and Imaging Apparatus"; Jun. 28, 2012; Abstract of JP201224729 (A).

Dae Sung Min; "Image Sensor for Sharing a Read Out Circuit and Method for Sharing the Read Out Circuit", Feb. 13, 2008; Abstract of KR100803229 (B1); 2 pages.

Office Action dated Mar. 7, 2014 in Korean Application No. 10-2013-0024263, filed Mar. 7, 2013.

* cited by examiner

DRIVING CIRCUIT OF IMAGE SENSOR AND METHOD OF OPERATING THE SAME

CROSS-REFERENCE TO RELATED APPLICATION

This application claims the benefit under 35 U.S.C. §119 of Korean Patent Application No. 10-2013-0024263, filed Mar. 7, 2013, which is hereby incorporated by reference in its entirety.

BACKGROUND

In an image sensor, an image signal including image information is generated by each pixel circuit. The image signals generated by each pixel circuit are delivered to an analog-to-digital converter (ADC) in order for digital conversion.

However, coupling occurs between a global signal for controlling a device such as an ADC and an image signal delivered from each pixel circuit, so that distortion may occur in the global signal. This effect is shown in FIG. 1.

FIG. 1 is a view when distortion occurs in a global signal and an output signal based on an input signal, in the case that the global signal is used to control a plurality of devices.

For example, if a device whose operation is controlled in response to a global signal is an ADC, a signal inputted into the ADC can be an image signal delivered from the pixel circuit. The image signal delivered from the pixel circuits may be signals (i.e., a falling edge) representing bright light and signals representing dark light. That is, image signals inputted into an ADC include signals having a large signal width and signals having a small signal width.

For example, when a signal 11 including information on a bright image has a falling edge and its signal width is large, a coupling capacitor is formed between global signals input to an ADC device. Also, due to such a coupling capacitor, distortion may occur in a global signal and also an input signal 22. On the other hand, since an output of a signal having a large signal width is less affected by distortion, a normal signal 21 can be output.

Thus, as the number of pixels used in an image sensor increases, the amount of data to be processed increases, and a global signal may be distorted due to image signals having a large signal width. This distortion of a global signal may eventually appear as noise of an image sensor.

BRIEF SUMMARY

Embodiments of the subject invention provide driving devices, and methods of manufacturing and driving the same, which inhibit the distortion of a global signal due to an image signal delivered from each pixel circuit.

In an embodiment, a driving circuit of an image sensor can include: a pixel array comprising pixel circuits for receiving light and converting the received light into an electrical signal arranged in columns, wherein the columns of pixel circuits comprise odd columns of pixel circuits alternating with even columns of pixel circuits, such that no odd column is adjacent to another odd column and no even column is adjacent to another even column; an analog-to-digital (ADC) block comprising a plurality of ADC circuits for receiving an analog image signal from pixel circuits arranged in the same column and for converting the received analog image signal into a digital signal; and an ADC controller outputting a global signal to control operations of the ADC circuits. The ADC controller can allow the ADC circuits in the ADC block to operate separately according to at least two timings.

In another embodiment, a method of driving a driving circuit of an image sensor, the driving circuit having the features discussed in the previous paragraph, can include: determining the number of timings at which the ADC circuits operate selectively; determining ADC circuits to be operated at the determined timing; and outputting a global signal from the ADC controller to control operations of the ADC circuits according to the timings.

DETAILED DESCRIPTION

Reference will now be made in detail to the embodiments of the present disclosure, examples of which are illustrated in the accompanying drawings.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

Figure 1:
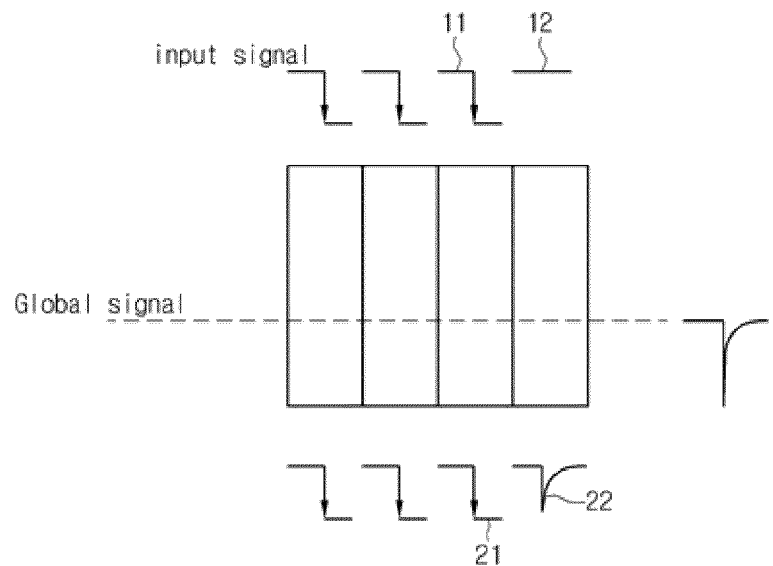
FIG. 1 is a view of when distortion occurs in a global signal and an output signal based on an input signal, in the case that the global signal is used to control a plurality of devices.
Figure 2:
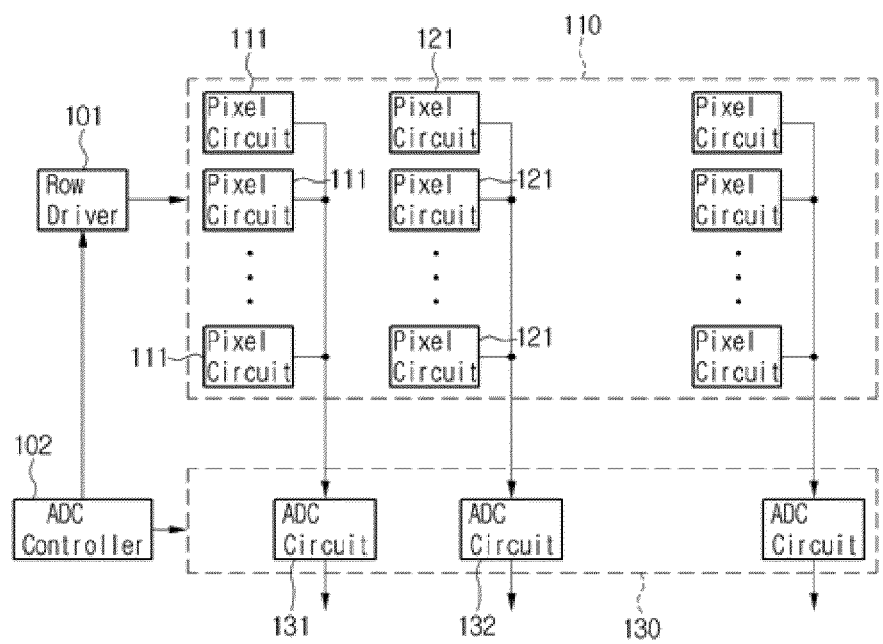
FIG. 2 is a view of a driving circuit of an image sensor according to an embodiment of the subject invention.

FIG. 2 is a view of a driving circuit of an image sensor according to an embodiment of the present invention.

Referring to FIG. 2, in an embodiment, a driving circuit of an image sensor can include a pixel array 110, a row driver 101, a column analog-to-digital converter (ADC) block 130, and an ADC controller 102. A memory device, such as random access memory (RAM), can receive a digital signal from the column ADC block 130 and can store the received digital signal. A data signal stored in the RAM can be provided to a driver through a readout bus, so as to generate an image.

The pixel array 110 can include a plurality of pixel circuits 111 and 121 arranged in a horizontal direction (or an X-axis direction) and a vertical direction (or a Y-axis direction). Each of the pixel circuits 111 and 121 can include a light-sensitive element (e.g., a photodiode) and can output a corresponding analog signal according to the light intensity of an area corresponding to when an image is captured. For example, each pixel circuit can include a transfer transistor (Tx), a reset transistor (Rx), a driver transistor (Dx), and/or a floating diffusion region.

The row driver 101 can provide a control signal to control each of the pixel circuits 111 and 121 of the pixel array 110. Pixel circuits in the same row can share a control signal delivered from the row driver 101.

Each of the pixel circuits disposed in the same column can share a common column readout line for delivering an analog signal including an image signal. Also, the row driver 101 can control pixel circuits in each column by each row.

An analog signal output from pixel circuits arranged in the same column in the pixel array 110 can be delivered to the ADC block 130. The ADC block 130 can include a plurality of ADC circuits 131 and 132 corresponding to respective columns, and each of the ADC circuit 131 and 132 can receive an image signal of pixel circuits delivered from a column readout line and can convert the received image signal into digital signals.

In an embodiment, the ADC controller 102 can control operations of the ADC circuit 131 and 132, and can also control operations of the row driver 101. The ADC controller 102 can deliver a global signal to the ADC circuits 131 and 132 in order to individually or selectively control the ADC circuit 131 and 132. The global signal output from the ADC controller 102 can selectively control ADC circuits according to timing.

Although not shown in the drawing, the image signals digital-converted in the ADC block 130 can be input to a memory device, and the image signals stored in the memory device (e.g., RAM) can be delivered to an image-generating driver through a readout bus.

According to certain embodiments, the ADC controller 102 can selectively operate the ADC circuits 131 and 132. That is, the ADC circuits can selectively operate in response to the global signal output from the ADC controller 102 and can be driven at different timings.

In more detail, in order not to simultaneously process an analog image signal delivered from pixel circuits, some of the ADC circuits in an ADC block can operate at a first timing (i.e., during a first time period) and the remaining ADC circuits can operate at a second timing (i.e., during a second time period).

When an analog image signal output from a pixel in an area of high light intensity has a large signal width, distortion can occur in a global signal due to a large analog signal having such a large signal width. Therefore, in order to minimize distortion, ADC circuits can selectively operate at a first timing and a second timing.

The position of a pixel circuit outputting an analog signal having a large signal width cannot be predicted, so in order to distribute the probability of distortion occurrence, an analog image signal delivered from pixel circuits in an odd column can be digitally converted at the first timing and an analog image signal delivered from pixel circuits in an even column can be digitally converted at the second timing.

Figure 3:
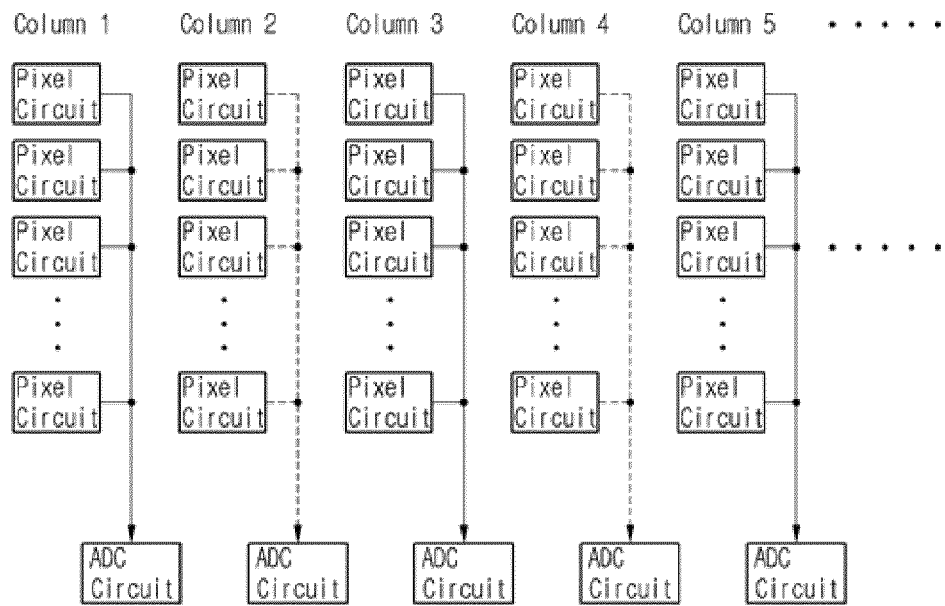
FIGS. 3 and 4 are views of methods for selectively processing an analog signal of a pixel circuit according to an embodiment of the subject invention.
Figure 4:
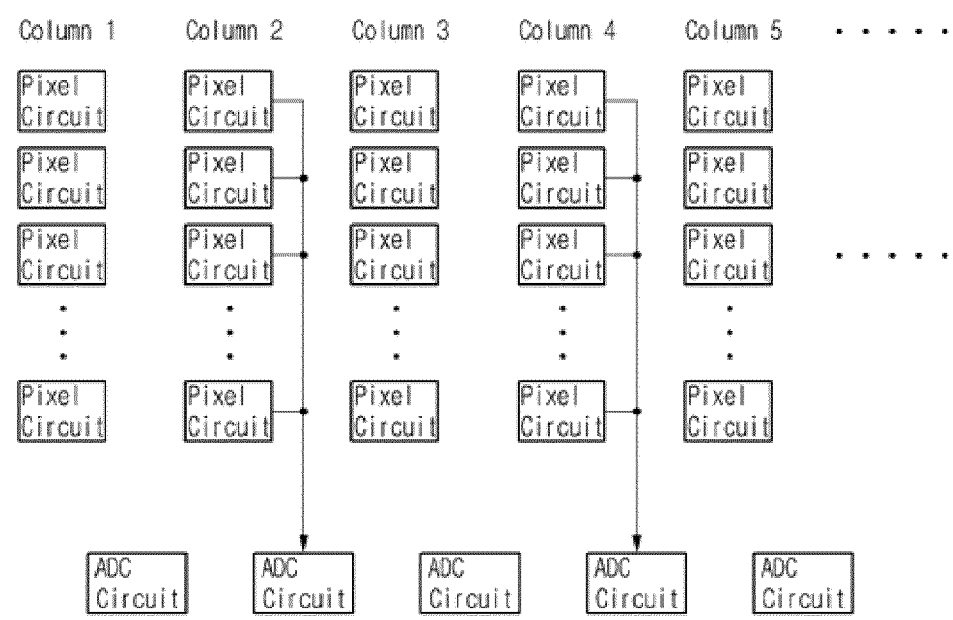

FIGS. 3 and 4 are views illustrating processes for selectively processing an analog signal of a pixel circuit according to an embodiment of the subject invention.

For example, if a device whose operation is controlled in response to a global signal is an ADC circuit, each ADC circuit can be connected to each of the pixel circuits in a corresponding column. Also, the ADC circuits can separately operate at the first timing and the second timing. Referring to FIG. 3, at the first timing, analog signals delivered from the pixel circuits in odd columns (e.g., column 1, column 3, and column 5) can be digitally converted by corresponding ADC circuits.

Referring to FIG. 4, at the next timing, (e.g., the second timing), analog signals delivered from the pixel circuits in even columns (e.g., column 2 and column 4) can be digitally-converted by corresponding ADC circuits.

Though three odd columns (columns 1, 3, and 5) and two even columns (columns 2 and 4) are shown for exemplary purposes, and embodiments are not limited thereto. Any reasonable number of columns can be provided, and the odd columns and even columns will alternate, such that no odd column is adjacent to another odd column and no even column is adjacent to another even column.

Through such a method, while image signals delivered from a plurality of pixel circuits are processed, the distortion of a global signal due to an analog signal having a large signal width can be reduced.

Figure 5:
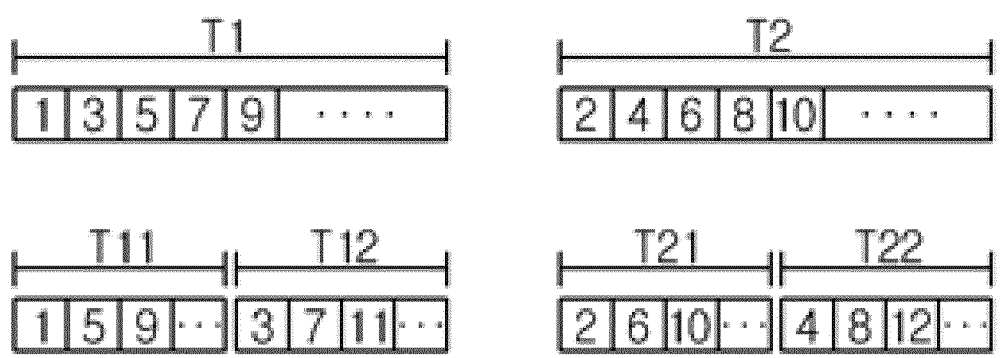
FIG. 5 is a view of when signals of pixel circuits are processed based on four timings according to an embodiment of the subject invention.

FIG. 5 is a view when signals of pixel circuits are processed based on four timings according to an embodiment of the present invention.

Referring to FIG. 5, signals of pixels circuits in odd columns (e.g., 1, 3, 5, 7, and 9) can be processed at the timing T1 (e.g., during a first period of time) and signals of pixels circuits in even columns (e.g., 2, 4, 6, 8, and 10) can be processed at the timing T2 (e.g., during a second period of time). Though five odd columns (1, 3, 5, 7, and 9) and five even columns (2, 4, 6, 8, and 10) are shown for exemplary purposes, and embodiments are not limited thereto. Any reasonable number of columns can be provided, and the odd columns and even columns will alternate, such that no odd column is adjacent to another odd column and no even column is adjacent to another even column. In an embodiment of the present invention, signals of pixel circuits can be processed based on four timings. As described above, since the position of an image signal having a large signal width may not be determined, ADC circuits can operate according to even columns and odd columns.

If signals output from the pixel circuits in odd columns are processed at the first timing, after the odd columns processed at the first timing are divided again, output signals of pixel circuits in columns such as 1, 5, and 9 can be processed at the timing T11 and output signals of pixel circuits in columns such as 3, 7, and 11 can be processed at the timing T12. The ADC circuits in the ADC block may digitally convert output signals of pixel circuits in columns such as 1, 5, and 9 at the first timing and may digitally convert output signals of pixel circuits in columns such as 3, 7, and 11 at the second timing. That is, the odd columns can be divided into a first set of odd sub columns and a second set of odd sub columns. Odd sub columns from the first and second sets alternate, such that the nearest odd sub column to any odd sub column in the first set, in either direction, is an odd sub column in the second set, and the nearest odd sub column to any odd sub column in the second set, in either direction, is an odd sub column in the first set.

In the same manner, the ADC circuits in the ADC block can digitally convert output signals of pixel circuits in columns such as 2, 6, and 10 at the third timing T21 and may digitally convert output signals of pixel circuits in columns such as 4, 8, and 12 at the fourth timing T22. That is, the even columns can be divided into a first set of even sub columns and a second set of even sub columns. Even sub columns from the first and second sets alternate, such that the nearest even sub column to any even sub column in the first set, in either direction, is an even sub column in the second set, and the nearest even sub column to any even sub column in the second set, in either direction, is an even sub column in the first set.

The above-described analog signal processing of the ADC circuits can be performed at several timings, and the ADC controller controlling operations of each ADC circuit can output a global signal to allow the ADC circuits to operate at different timings.

That is, the ADC controller 102 can determines how many timings are divided to operate the ADC circuits. In many embodiments of the subject invention, the determined number of timings can be two or more.

Then, the ADC controller 102 can determine which ADC circuits in a position are to be operated at each timing. For example, the ADC circuits connected to the pixel circuits arranged in an odd column can be operated at the first timing, and the ADC circuits connected to the pixel circuits arranged in an even column can be operated at the second timing. As another example, by dividing the odd column into two column groups (e.g., a first set of odd sub columns and a second set of odd sub columns), signal processing on a column arranged at an interval such as 1, 5, and 9 can be performed at the first timing.

Then, the ADC controller can output a global signal to operate corresponding ADC circuits at each timing. This global signal can be sequentially delivered from the first ADC circuit, and can include information on the time at which each ADC circuit operates.

According to devices and methods of the subject invention, a driving circuit of an image sensor can operate so that distortion such as noise may be significantly decreased in a global signal for controlling the timing of a device.

In embodiments of the subject invention, distortion can be greatly decreased in a global signal that controls an individual device in response to an analog image signal having a large signal width.

Additionally, through such reliable signal processing, noise in a displayed image can be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

What is claimed is:

1. A driving circuit of an image sensor, comprising:
a pixel array comprising pixel circuits for receiving light and converting the received light into an electrical signal, the pixel circuits in columns, wherein the columns of pixel circuits comprise odd columns of pixel circuits alternating with even columns of pixel circuits, such that no odd column is adjacent to another odd column and no even column is adjacent to another even column, the odd columns comprise first odd sub columns and second odd sub columns alternating with the first odd sub columns, such that the nearest odd sub column to any first odd sub column, in either direction, is a second odd sub column, and the nearest odd sub column to any second odd sub column, in either direction, is one of the first odd sub columns, and the even columns comprise first even sub columns and second even sub columns alternating with the first even sub columns, such that the nearest even sub column to any first even sub column, in either direction, is a second even sub column, and the nearest even sub column to any second even sub column, in either direction, is one of the first even sub columns;
an analog-to-digital (ADC) block comprising a plurality of ADC circuits for receiving an analog image signal from pixel circuits arranged in the same column and for converting the received analog image signal into a digital signal, wherein the plurality of ADC circuits comprises a plurality of first odd ADC circuits, each first odd ADC circuit connected to and controlling pixel circuits of one of the first odd sub columns, a plurality of second odd ADC circuits, each second odd ADC circuit connected to and controlling pixel circuits of one of the second odd sub columns, a plurality of first even ADC circuits, each first even ADC circuit connected to and controlling pixel circuits of one of the first even sub columns, and a plurality of second even ADC circuits, each second even ADC circuit connected to and controlling pixel circuits of one of the second even sub columns; and
an ADC controller outputting a global signal to control operations of the ADC circuits,
wherein the ADC controller allows the ADC circuits in the ADC block to operate separately according to at least four timings.

2. The driving circuit according to claim 1, wherein the ADC controller controls the ADC circuits such that the first odd ADC circuits operate at a first timing, the second odd ADC circuits operate at a second timing, the first even ADC circuits operate at a third timing, and the second even ADC circuits operate at a fourth timing; and
the first, second, third, and fourth timings are all different from each other.

3. The driving circuit according to claim 1, wherein the plurality of devices are connected to pixel circuits in the same column.

4. The driving circuit of claim 1, wherein each pixel circuit includes a transfer transistor, a reset transistor, a driver transistor, and a floating diffusion region.

5. The driving circuit of claim 4, wherein each of the first odd ADC circuits is connected to and controls pixel circuits of one of the first odd sub columns, each of the second odd ADC circuits is connected to and controls pixel circuits of one of the second odd sub columns, each of the first even ADC circuits is connected to and controls pixel circuits of one of the first even sub columns, and each of the second even ADC circuits is connected to and controls pixel circuits of one of the second even sub columns.

6. The driving circuit of claim 1, further comprising a row driver that provides a control signal to each of the pixel circuits in a row of the pixel array.

7. The driving circuit of claim 1, wherein each of the pixel circuits in a same column share a common column readout line.

8. The driving circuit of claim 7, wherein the pixel circuits deliver an analog signal on the common column readout line.

9. A driving circuit of an image sensor, comprising:
a controller providing a global signal to a plurality of devices in order to operate the plurality of devices according to at least four different timings, wherein the plurality of devices comprises a plurality of first odd devices, a plurality of second odd devices, a plurality of first even devices, and a plurality of second even devices; and
a plurality of pixel circuits in columns, each column of pixel circuits delivering an image signal to one of the plurality of devices, wherein the columns of pixel circuits comprise odd columns of pixel circuits alternating with even columns of pixel circuits, such that no odd column is adjacent to another odd column and no even column is adjacent to another even column, the odd columns comprise first odd sub columns and second odd sub columns alternating with the first odd sub columns, such that the nearest odd sub column to any first odd sub column, in either direction, is a second odd sub column, and the nearest odd sub column to any second odd sub column, in either direction, is one of the first odd sub columns, the even columns comprise first even sub columns and second even sub columns alternating with the first even sub columns, such that the nearest even sub column to any first even sub column, in either direction, is a second even sub column, and the nearest even sub column to any second even sub column, in either direction, is one of the first even sub columns, the first odd sub columns deliver the image signal to one of the first odd devices, the second odd sub columns deliver the image signal to one of the second odd devices, the first even sub columns deliver the image signal to one of the first even devices, and the second even sub columns deliver the image signal to one of the second even devices;

wherein the controller controls the first odd devices to operate at a first timing, the second odd devices to operate at a second timing, the first even devices to operate at a third timing and the second even devices to operate at a fourth timing.

10. The driving circuit of claim 9, wherein each of the first odd devices, second odd devices, first even devices, and second even devices comprises an ADC circuit.

11. The driving circuit of claim 9, wherein each pixel circuit includes a transfer transistor, a reset transistor, a driver transistor, and a floating diffusion region.

12. The driving circuit of claim 9, further comprising a row driver that provides a control signal to each of the pixel circuits in a row of the pixel array.

13. The driving circuit of claim 9, wherein each of the pixel circuits in a same column share a common column readout line.

14. The driving circuit of claim 13, wherein the pixel circuits deliver an analog signal on the common column readout line.

15. A method of driving a driving circuit of an image sensor, the driving circuit comprising:

a pixel array comprising pixel circuits for receiving light and converting the received light into an electrical signal, the pixel circuits in columns, wherein the columns of pixel circuits comprise odd columns of pixel circuits alternating with even columns of pixel circuits, such that no odd column is adjacent to another odd column and no even column is adjacent to another even column, the odd columns comprise first odd sub columns and second odd sub columns alternating with the first odd sub columns, such that the nearest odd sub column to any first odd sub column, in either direction, is a second odd sub column, and the nearest odd sub column to any second odd sub column, in either direction, is one of the first odd sub columns, and the even columns comprise first even sub columns and second even sub columns alternating with the first even sub columns, such that the nearest even sub column to any first even sub column, in either direction, is a second even sub column, and the nearest even sub column to any second even sub column, in either direction, is one of the first even sub columns;

an analog-to-digital (ADC) block comprising a plurality of ADC circuits for receiving an analog image signal from pixel circuits arranged in the same column and for converting the received analog image signal into a digital signal, wherein the plurality of ADC circuits comprises a plurality of first odd ADC circuits, each first odd ADC circuit connected to and controlling pixel circuits of one of the first odd sub columns, a plurality of second odd ADC circuits, each second odd ADC circuit connected to and controlling pixel circuits of one of the second odd sub columns, a plurality of first even ADC circuits, each first even ADC circuit connected to and controlling pixel circuits of one of the first even sub columns, and a plurality of second even ADC circuits, each second even ADC circuit connected to and controlling pixel circuits of one of the second even sub columns; and an ADC controller outputting a global signal to control operations of the ADC circuits, wherein the ADC controller allows the ADC circuits in the ADC block to operate separately according to at least four timings;

wherein the method comprises:

determining a number of timings at which the ADC circuits operate;

outputting a global signal from the ADC controller to control operations of the ADC circuits according to the timings; and operating the ADC circuits at the determined timings.

16. The method according to claim 15, wherein the ADC controller controls the ADC circuits such that the first odd ADC circuits operate at a first timing, the second odd ADC circuits operate at a second timing, the first even ADC circuits operate at a third timing, and the second even ADC circuits operate at a fourth timing; and the first, second, third, and fourth timings are each different from each other.

17. The method of claim 15, wherein each pixel circuit includes a transfer transistor, a reset transistor, a driver transistor, and a floating diffusion region.

18. The method of claim 15, further comprising providing a control signal to each of the pixel circuits in a row of the pixel array.

19. The method of claim 15, wherein each of the pixel circuits in a same column share a common column readout line.

20. The method of claim 19, further comprising delivering an analog signal on the common column readout line from the pixel circuits.

21. The method of claim 20, further comprising converting the analog signal to a digital signal using a corresponding ADC circuit.

* * * * *